(12) United States Patent
Meachen

(10) Patent No.: US 12,136,954 B2
(45) Date of Patent: Nov. 5, 2024

(54) OPTICAL RECEIVERS

(71) Applicant: Semtech Corporation, Camarillo, CA (US)

(72) Inventor: Jacob Meachen, Gloucester (GB)

(73) Assignee: Semtech Corporation, Camarillo, CA (US)

( * ) Notice: Subject to any disclaimer, the term of this patent is extended or adjusted under 35 U.S.C. 154(b) by 107 days.

(21) Appl. No.: 17/818,909

(22) Filed: Aug. 10, 2022

(65) Prior Publication Data
US 2024/0056194 A1 Feb. 15, 2024

(51) Int. Cl.
*H04B 10/60* (2013.01)

(52) U.S. Cl.
CPC ................... *H04B 10/60* (2013.01)

(58) Field of Classification Search
CPC ...................................... H04B 10/60
USPC ........................................... 398/208
See application file for complete search history.

(56) References Cited

U.S. PATENT DOCUMENTS

| | | | | |
|---|---|---|---|---|
| 9,203,509 B2 * | 12/2015 | Wang | ............... | H04B 10/07955 |
| 2006/0067710 A1 * | 3/2006 | Liu | .................... | H04B 10/6932 398/202 |
| 2007/0004414 A1 * | 1/2007 | Seki | ................ | H04W 36/00837 455/441 |
| 2007/0023615 A1 * | 2/2007 | Ruegg | ....................... | G01J 1/44 250/214 R |
| 2011/0026921 A1 * | 2/2011 | Ossieur | ................ | H04B 10/272 398/58 |
| 2012/0163809 A1 * | 6/2012 | Sugawa | ............... | H04B 10/272 398/72 |
| 2016/0248534 A1 * | 8/2016 | Kuang | .................. | H04B 10/503 |
| 2017/0033867 A1 * | 2/2017 | Robinson | ......... | H04B 10/07955 |

FOREIGN PATENT DOCUMENTS

| | | | | |
|---|---|---|---|---|
| CN | 102771065 A | * | 11/2012 | ............. H04B 10/69 |
| EP | 1794906 | | 6/2007 | |
| EP | 1794906 B1 | * | 10/2010 | ............. G06F 3/147 |
| EP | 2634933 A1 | * | 9/2013 | ............. H04B 10/07 |
| WO | WO 2006/039203 A1 | | 4/2006 | |

OTHER PUBLICATIONS

Extended European Search Report for EP Patent Application No. 23179457.9 dated Jan. 2, 2024 (10 pages).

* cited by examiner

*Primary Examiner* — Abbas H Alagheband
(74) *Attorney, Agent, or Firm* — Alston & Bird LLP

(57) ABSTRACT

A packaged optical receiver, comprising: a photodiode configured to receive an optical signal; a transimpedance amplifier (TIA) coupled to the photodiode; and a signal pin; wherein the optical receiver is configured to receive, via the signal pin, a reset signal; and wherein the optical receiver is configured to output in response to the reset signal, via the signal pin, a received signal strength indication (RSSI) for the received optical signal.

12 Claims, 8 Drawing Sheets

OPTICAL RECEIVERS

TECHNICAL FIELD

The present disclosure relates to improved signalling within optical line terminals, more specifically between transimpedance amplifiers (TIAs) and receivers.

BACKGROUND

In a passive optical network (PON), an optical line terminal (OLT) may communicate with a large number of optical network units (ONUs). An optical data link is formed between the OLT and the various ONUs in the PON. The optical data link is formed of a single fibre optic cable, connected to the OLT, which branches off to connect to the multiple ONUs in the network.

In such an optical data link, information is encoded by modulating the amplitude of an optical signal which propagates through an optical fibre to a receiver at the end of the link. Such a receiver may be implemented within an ONU or an OLT for example. A photodiode in the receiver generates an electrical current which is proportional to the optical signal amplitude. Using a transimpedance amplifier (TIA), this current is amplified and converted to a voltage signal which can be further amplified and processed to decode the encoded information.

OLTs may need to monitor the health of the network by measuring the received optical power from each ONU in the network. This measurement may be done by sending a succession of bursts of optical signals from each ONU in the network to the OLT. Such bursts are known as Received Signal Strength Indicators (RSSIs). Such RSSIs would then be converted and amplified by a TIA as described above.

Existing burst mode RSSI solutions typically use a specialist high-side current mirror to measure RSSI current. Such circuitry adds significant expense and complexity to an OLT and can take up large amounts of circuit real estate.

SUMMARY

According to a first aspect of the disclosure, there is provided a packaged optical receiver, comprising: a photodiode configured to receive an optical signal; a transimpedance amplifier (TIA) coupled to the photodiode; and a signal pin; wherein the optical receiver is configured to receive, via the signal pin, a reset signal; and wherein the optical receiver is configured to output in response to the reset signal, via the signal pin, a received signal strength indication (RSSI) for the received optical signal.

The optical receiver may be further configured to receive via the signal pin: a rate select signal indicating a bit rate of the received optical signal.

A sensitivity of the transimpedance amplifier may be adjusted based on the rate select signal.

On a first transition of the reset signal, the optical receiver may be configured to sample the rate select signal received before the first transition of the reset signal.

The rate select signal may be switchable between a first voltage indicative of a first bit rate of the received optical signal and a second voltage indicative of a second bit rate of the received optical signal different from the first bit rate. The first bit rate may, for example, by 2.5 Gb/s and the second bit rate may be, for example, 10 Gb/s. The first voltage and the second voltage are preferably lower than a reset voltage of the reset signal. As such, the optical receiver may be able to distinguish between receive of each of the first voltage, the second voltage and the reset voltage.

The optical receiver may further comprise a first comparator having a first inverting input coupled to a first reference voltage; and a second comparator having a second inverting input coupled to a second reference voltage. A first non-inverting input of the first comparator and a second non-inverting input of the second comparator may be coupled to the signal pin.

The optical receiver may further comprising a flip-flop (or latch) having: a clock input coupled to a first output of the first comparator; a data input coupled to a second output of the second comparator; and a digital rate select output. The flip-flop may be a D-type flip-flop (i.e. a data flip flop).

The optical receiver may further comprising a delay element coupled between the data input and the second output of the comparator. The delay element may be configured to delay the arrival of signals from the second output of comparator at the data input.

The optical receiver may be configured to output the RSSI at the signal pin after the first transition of the reset signal.

The optical receiver may comprise current driver circuitry configured to output the RSSI at the signal pin in response to an enable signal.

The current driver circuitry may comprise: a switch; and a load resistor coupled between the switch and a ground reference voltage. The switch may be configured to switch the RSSI from the load resistor to the signal pin in response to the enable signal. The switch may comprise a differential pair of switches, such as a PMOS differential pair.

The photodiode may comprise an avalanche photodiode (APD). Alternatively the photodiode may comprise a PIN photodiode.

According to another aspect of the disclosure, there is provided a system, comprising: the optical receiver as described above; and a host device coupled to the optical receiver via the signal pin, wherein the host device is configured to: output the reset signal to the signal pin; and receive the RSSI signal via the signal pin.

Where the optical receiver receivers the rate select signal via the signal pin, the host device may be configured to output the rate select signal to the signal pin.

The host device may comprise: a current monitor configured to measure a current of the RSSI received at the signal pin; and sampling circuitry configured to sample the measured current of the RSSI.

The system may further comprise an analog-to-digital converter (ADC) configured to convert the sampled measured current into a digital RSSI signal.

The host device may be configured to output one or more of the reset signal and the rate select signal in response to a trigger signal received at the host device.

The optical receiver may be packaged in a first integrated circuit (IC) and the host device is packaged on a second IC. The first and second ICs may be mounted on a printed circuit board (PCB). Communication between the optical receiver and the host device may be via one or more tracks on the PCB.

According to another aspect of the disclosure, there is provided a host device, comprising a signal pin. The host device is configured to output, via the signal pin, a reset signal to an optical receiver. The host device is further configured to receive in response to the reset signal and via the signal pin, a received signal strength indication (RSSI) of an optical signal received by the optical receiver. The host device may be further configured to output, via the signal pin, a rate select signal to the optical receiver. The rate select signal may indicate a bit rate of an optical signal received at the optical receiver.

According to another aspect of the disclosure, there is provided an optical receiver host device, comprising: a signal pin; and driver circuitry configured to output to an optical receiver sub assembly via the signal pin: a rate select signal indicating a bit rate of an optical signal received at the optical receiver sub assembly; and a reset signal; and measurement circuitry configured to: receive, in response to the reset signal and via the signal pin, a received signal strength indication (RSSI) signal; and process the RSSI signal.

According to another aspect of the disclosure, there is provided a method for use in an optical line terminal, the method comprising: over a single data line, time division multiplexing: a reset signal from a host device to a transimpedance amplifier (TIA); a rate select signal from the host device to the TIA; and a received signal strength indication (RSSI) signal from the TIA to the host device.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Figure 1:
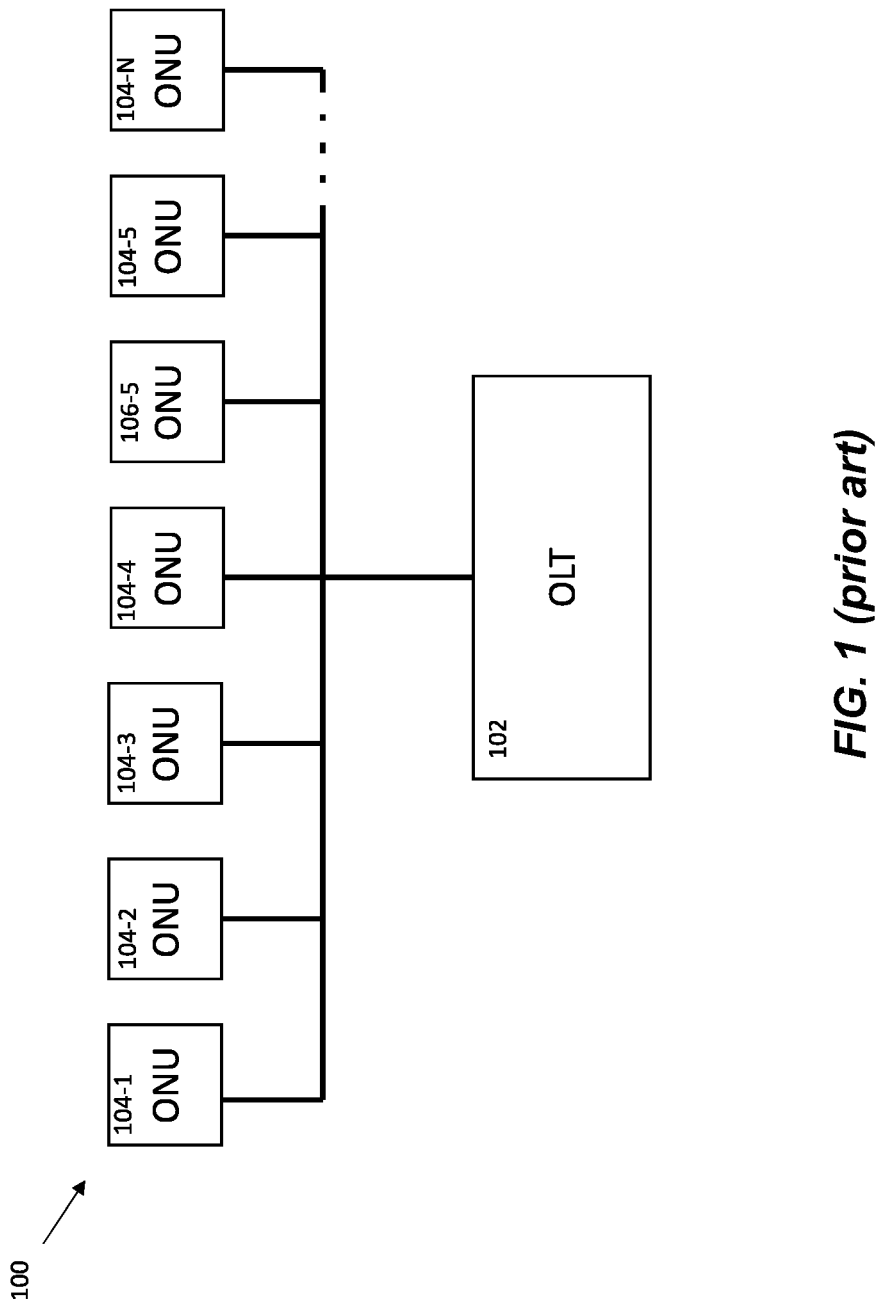
FIG. 1 illustrates a block diagram of a passive optical network.

FIG. 1 is a block diagram of a known passive optical network (PON) 100. The PON comprises an optical line terminal (OLT) 102 in communication with a plurality of optical network units (ONUs). The OLT 102 may be located, for example, at a central office of an internet service provider (ISP). The ONUs 104-1:104-N may be located, for example, at clients' homes or offices. The ONUs 104n and the OLT 102 communicate via one or more fibre optic cables configured to carry information in the form of optical signals. Thus, an optical data link is formed between the OLT 102 and the various ONUs 104-1:104-N within the PON 100.

Figure 2:
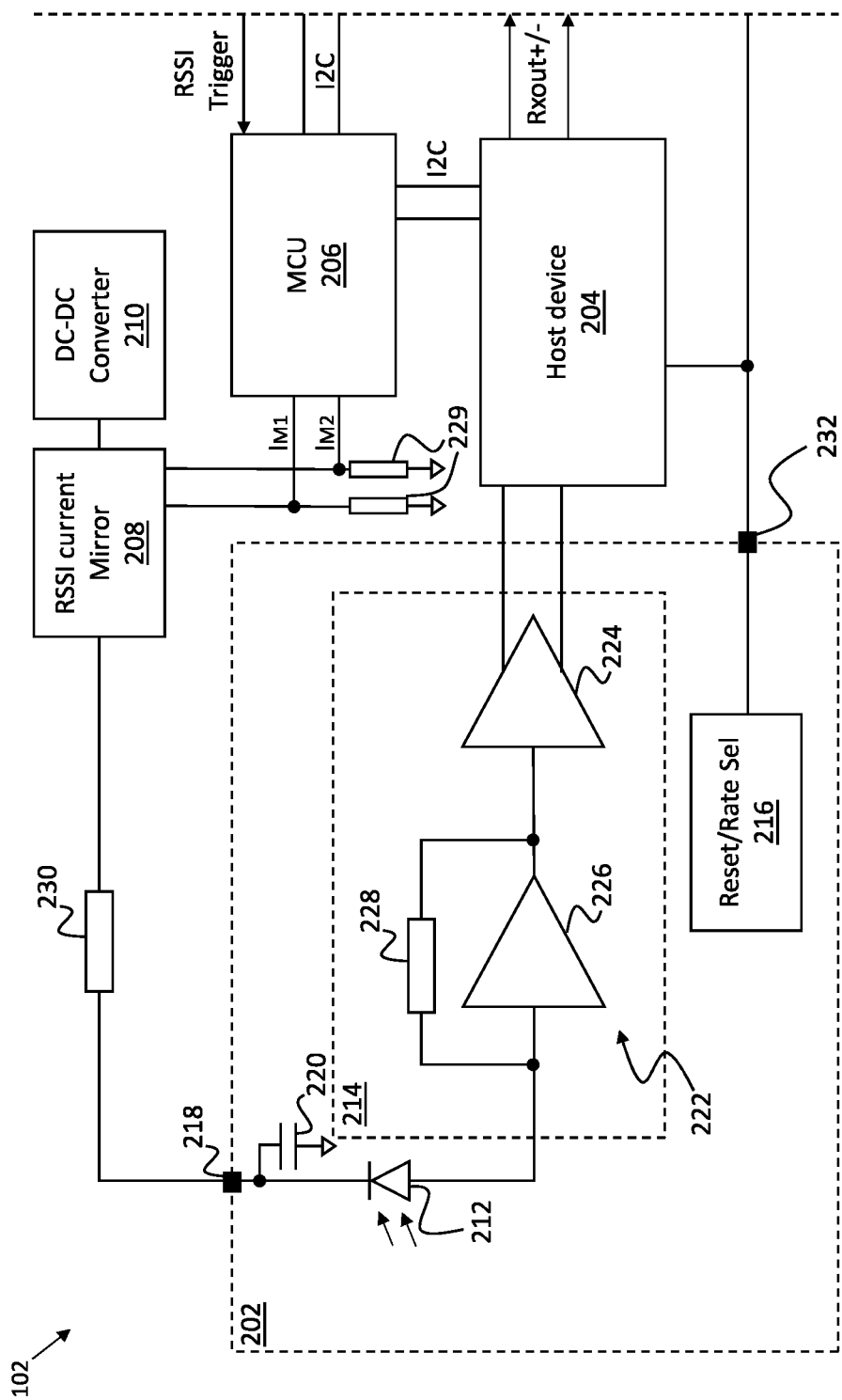
FIG. 2 is a schematic diagram of an optical line terminal.

FIG. 2 shows a known example implementation of the OLT 102 shown in FIG. 1.

The OLT 102 comprises an optical receiver 202, a host device 204, a microcontroller (MCU) 206, a received signal strength indication (RSSI) current mirror 208, and a DC-DC converter 210. The optical receiver 202 and the host device 204 may be packaged on separate integrated circuits (ICs). In which case, communications between the optical receiver 202 and the host device 204 may be via one or more traces on a printed circuit board (PCB) to which the optical receiver 202 and the host device 204 are mounted.

The optical receiver 202 comprises a photodiode 212 (such as an avalanche photodiode (APD)), a transimpedance amplifier (TIA) 214, and a reset and rate select module 216.

The photodiode 212 is coupled between a supply pin 218 of the optical receiver 202 and the TIA 214. A decoupling capacitor 220 may be coupled between a cathode of the photodiode 212 and a ground reference (e.g. GND).

The photodiode 212 is configured to receive an optical signal via an optical fibre of the PON 100. The optical signal may be received from one of the ONUs 104-1:104-N of the PON 100. Upon receipt of the incident optical signal, the photodiode 212 generates a current $I_{PD}$ which is proportional to the power of the optical signal. This current $I_{PD}$ is transferred into the TIA 214, which converts the current value $I_{PD}$ into a voltage $V_{PD}$.

The TIA 214 comprises a first TIA stage 222 and a second TIA stage 224. The first TIA stage 222 comprises an operational amplifier (op-amp) 226 and a feedback resistor 228 coupled between an input and an output of the op-amp 226. The first TIA stage 222 is configured to generate the voltage $V_{PD}$ representing the current $I_{PD}$ generated by the photodiode 212.

The second TIA stage 224 is configured to convert the voltage $V_{PD}$ output from the first TIA stage into a differential pair of outputs $V_{PD+}$, $V_{PD-}$ for output to the host device 204. In other embodiments, the second TIA stage 224 may be omitted. In which case, the voltage $V_{PD}$ may be output directly to the host device 204. In other embodiments, the first and second TIA stages 222, 224 may be combined into a single stage.

The RSSI current mirror 208 is coupled to the photodiode, optionally via an overload resistor 230, at a photodiode pin 218 of the optical receiver 202, and is configured to measure a photodiode current $I_{PD}$. The DC-DC converter 210 is coupled to the RSSI current mirror 208, and is configured to provide a supply voltage to the current mirror 208 as well as to the photodiode 212 such that it operates with a reverse bias. The DC-DC converter 210 may be configured to convert a voltage from an external DC power source (not shown) to a voltage level suitable for the photodiode 312.

The RSSI current mirror 208 may comprise multiple current mirrors, each operating across a different voltage range such that an overall voltage range of the RSSI current mirror 208 covers the voltage swing at the supply pin 218. Tails 229 of each current mirror of the RSSI current mirror 208 are coupled to the MCU 206. As such, the MCU 206 receives mirrored currents $I_{M1}$, $I_{M2}$ from the RSSI current mirror 208. The MCU 206 may be configured to determine which of the mirrored currents $I_{M1}$, $I_{M2}$ to use based on their respective magnitudes. To do so, the MCU 206 may be configured to compare the mirrored currents $I_{M1}$, $I_{M2}$ to each other or one or more thresholds. The MCU 206 may be further configured to process this information and/or send it to further downstream circuitry. Such signal transmission may use one or more serial (e.g. I²C) interfaces.

The MCU 206 may be further configured to receive an RSSI trigger signal from an external source (not shown).

The MCU 206 may also be configured to control the host device 204 via an interface, in this case an I²C serial interface.

The host device 204 is further configured to generate rate select and reset signals and transmit these signals to the rate select module 216 of the optical receiver 202 via a signal pin 232. The rate select signal provides an indication to the optical receiver 202 of the bit rate of the receiver optical signals at the photodiode 212. As such, the optical receiver 202 may adjust operation of the TIA 214 in response to the rate select signal. For example, an incoming optical signal having a lower data rate (e.g. 2.5 GB/s) may necessitate a lower power, high-gain state within the TIA 214 to improve the optical receiver's accuracy. On the other hand, an optical signal having a higher data rate (e.g. 10 GB/s) may necessitate a higher power, lower-gain state within the TIA 214 to improve the optical receiver's accuracy.

The topology of the OLT 102 has a number of drawbacks. To achieve the accuracy and timing specifications of state-of-the-art optical networks, the RSSI current mirror 208 needs to be implemented using high performance off-chip components. Such components tend to be technically complex and power intensive, occupying a relatively large amount of circuit real-estate. In addition, multiple mirror ratios are typically required to cover the large dynamic range of the photodiode current $I_{PD}$. Due to this, the settling times of currents IM1, IM2 output from the RSSI current mirror 208 can be undesirably long. This issue is compounded when operating at high bit rates, in which the signal bursts and their preambles have extremely short durations. The addition of such a complex RSSI current mirror 208 can also lead to more complex signal routing requirements, as well as an increased chance of crosstalk, which negatively affects the overall performance and accuracy of the OLT 102.

Embodiments of the present disclosure aim to address or at least ameliorate one or more of the above problems by signalling RSSI to the host device via a common signal pin which is also used to transmit rate select and reset signals to an optical receiver. In doing so, the high-side current mirror 208 can be omitted, and the RSSI current sampled in host device 204 itself. By signalling RSSI, rate select and reset at a bidirectional signal pin, the overall number of pins of the receiver is reduced. Such signals can be time-division multiplexed to allow bidirectional transmission; the rate select and reset signals one way (from a host device to an optical receiver) and the RSSI signal the other way (from the optical receiver to the host device) over a shared signal pin.

Figure 3:
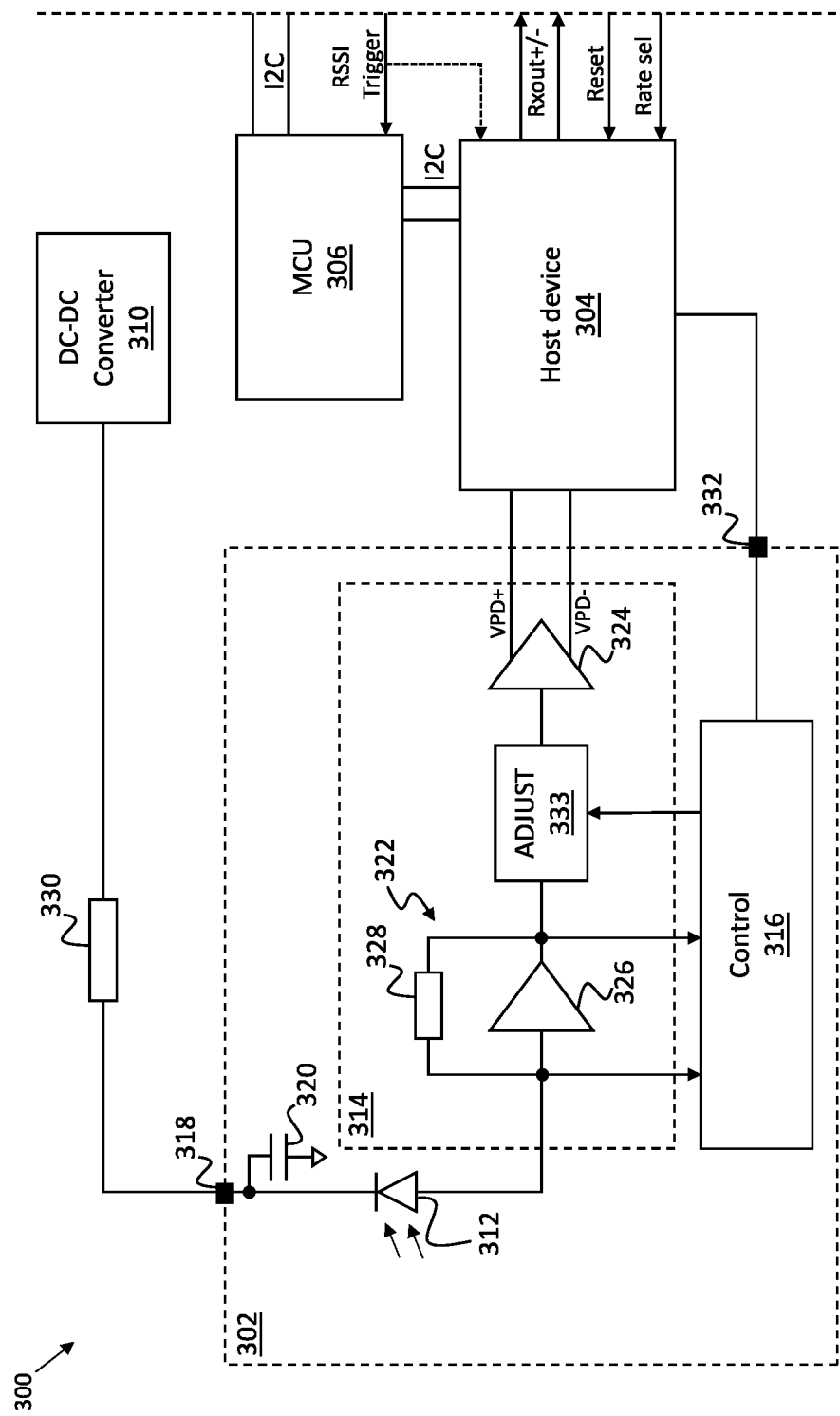
FIG. 3 is a schematic diagram of the optical line terminal according to embodiments of the present disclosure.

FIG. 3 illustrates an optical line terminal 300 according to embodiments of the present disclosure.

The OLT 300 comprises an optical receiver 302, a host device 304, a MCU 306 and a DC-DC converter 310. The optical receiver 302 and the host device 304 may be packaged on separate integrated circuits (ICs). In which case, communications between the optical receiver 302 and the host device 304 may be via one or more traces on a printed circuit board (PCB) to which the optical receiver 302 and the host device 304 are mounted.

The optical receiver 302 comprises a photodiode 312 (such as an avalanche photodiode (APD)), a transimpedance amplifier (TIA) 314, and a control module 316.

The photodiode 312 is coupled between a supply pin 318 of the optical receiver 202 and the TIA 314. A decoupling capacitor 320 may be coupled between a cathode of the photodiode 312 and a ground reference (e.g. GND).

The DC-DC converter 310 may be configured to convert a DC supply voltage from an external power supply (not shown) to a supply voltage, which may be provided to a supply pin 318 of the optical receiver 302, optionally via an overload resistor 330. As such, in operation, the photodiode 312 is reverse biased by the supply voltage provided from the DC-DC converter 310.

The photodiode 312 is configured to receive an optical signal. Such an optical signal may be received via an optical fibre of the PON 100. The optical signal may be received from one of the ONUs 104-1:104-N of the PON 100. Upon receipt of the incident optical signal, the photodiode 312 generates a current $I_{PD}$ which is proportional to the power of the optical signal. This current $I_{PD}$ is transferred into the TIA 314, which converts the current $I_{PD}$ into a voltage $V_{PD}$.

Like the TIA 214 shown in FIG. 2, the TIA 314 may comprises a first TIA stage 322 and a second TIA stage 324. The first TIA stage 322 may comprise an operational amplifier (op-amp) 326 and a feedback resistor 328 coupled between an input and an output of the op-amp 326, although any other known TIA topologies may be used. The first TIA stage 322 is configured to generate the voltage $V_{PD}$ representing the current IPS generated by the photodiode 312. The second TIA stage 324 is configured to convert the voltage VPD output from the first TIA stage 322 into a differential pair of outputs VPD+, VPD− for output to the host device 304. In other embodiments, the second TIA stage 324 may be omitted. In which case, the voltage VPD may be output directly to the host device 304. In yet further embodiments, the first and second TIA stages 322, 324 may be combined into a single stage.

The TIA 314 further may comprise an adjustment module 333 configured to adjust one or more properties of the TIA 314 based on one or more control signals from the control module 316, as is described in more detail below. Such properties may include one or more of a gain of the TIA 314 and a sensitivity of the TIA 314. In the embodiment shown, the adjustment module 333 is provided between the first and second TIA stages 322, 324. In other embodiments, the adjustment module 333 may be provided elsewhere in the TIA 314.

As noted above, the optical receiver 302 is configured to receive and process a rate select signal and a reset signal over the signal pin 332. Additionally and in contrast to the optical receiver 202, the optical receiver is further configured to transmit an RSSI signal over the same signal pin 332 to the host device 304. Such operation of the optical receiver 302 may be implemented by the control module 316.

Generally, responsive to the received reset signal received from the host device 304 over the signal pin 332, the control module 316 is configured to a) control the TIA 314 based on a received rate select signal, and b) to generate and drive an RSSI signal over the signal pin 332.

In some embodiments, the rate select signal may be received before the reset signal. In which case, the control module 316 may be trigger by the control module 316 to retrospectively process the rate select signal upon receipt of the reset signal.

As noted above, the control module 316 may control the adjustment module 333 to adjust one or more characteristics of the TIA 314 based on the rate select signal, for example, based on a level of the rate select signal. For example, the control module 316 may compare the rate select signal with one or more threshold voltages. Based on whether the rate select signal is above or below a threshold, the control module 316 may control the adjustment module 333 to adjust the TIA 314 into two or more different configurations.

The control module 316 is further configured to monitor for receipt of the reset signal and output an RSSI current at the signal pin 332 in dependence on receipt of the reset signal. The RSSI current may be output at the signal pin 332 immediately upon receipt of the reset signal. The RSSI current may be generated in dependence of an RSSI measured at the TIA 314. For example, the control module 316 may determine a RSSI of the received optical signal based on one or more signals derived from the TIA 314. For example, the RSSI may be determined based on an input voltage at the input of the first TIA stage 322, an output voltage of the first TIA or a combination of both voltages. In some embodiments, the control module 316 may determine a voltage drop across the feedback resistor 328 of the first TIA stage 322.

It can be seen that, unlike the OLT 200 which requires the RSSI current mirror 208, the OLT 300 does not require a current mirror on the high side of the photodiode 312. Instead, the RSSI signal is generated within the optical receiver 302. As such, The RSSI current output to the signal pin 332 is transmitted to the host device 304.

As noted above, the host device 304 is configured to receive the differential voltage pair VPD+, VPD− from the TIA 314 (or a single ended voltage VPD if the second TIA stage 324 is omitted). The host device 304 may optionally amplify and/or process the received voltage pair VPD+, VPD− and output one or more received signals Rxout+/− to an external device (not shown). Such processing is known in the art and so will not be described here in detail.

The host device 304 is further configured to generate both the reset signal and the rate select signal which are output over the same line to the signal pin 332 of the optical receiver 302. Generation of the reset signal and/or the rate signal may be in response to a received RSSI trigger signal, which may be received from the MCU 306 or alternatively from an external device (not shown).

It is noted that in some embodiments of the present disclosure, the rate select signal may not be generated, transmitted or used in any manner. For example, in some embodiments, the OLT 300 may operate at a single bit rate. In which case, functionality surrounding the rate select signal may be omitted.

To enable bidirectional transmission of the rate select signal, the reset signal, and the RSSI signal over the signal pin 332, such signals may be time-division multiplexed.

Figure 4:
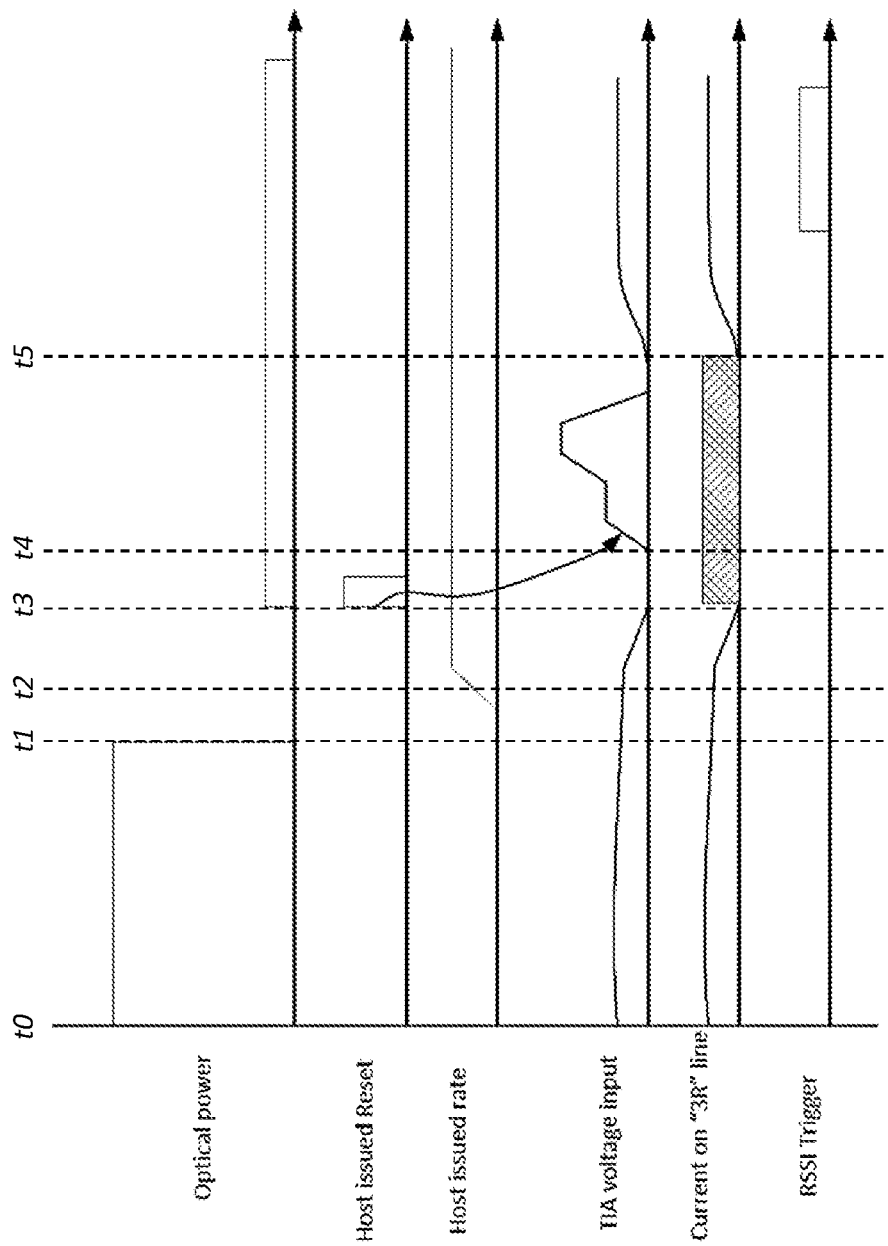
FIG. 4 is a is a timing diagram of a signal transmission regime according to embodiments of the present disclosure.

FIG. 4 is a timing diagram of a signal transmission regime according to embodiments of the present disclosure.

It will be appreciated that the optical signal is received at the photodiode 312 in packets or bursts separated by periods of low or no optical power, as shown by the step changes in optical power in FIG. 4.

Having this in mind, at time t0 the control module 316 is outputting an RSSI current on the signal pin 332, representative of the RSSI of the received optical signal. In the embodiment shown, the RSSI current at the signal pin 332 is substantially proportional to the voltage at the input of the TIA 314.

At time t2, the host device 304 transitions a rate select signal at the signal pin 332 from a first state to a second state. The rate select signal indicates the bit rate of the next packet to be received at the OLT 300. In some embodiments, the rate select signal is output in response to one or more received control signals, for example from the MCU 306. In the embodiment shown, the rate select signal has two levels (high or low). In other embodiments, the rate select signal may have more than two levels.

At time t3, responsive to an RSSI trigger signal, the host device 304 is configured to output the reset signal to the signal pin 332. It can be seen that embodiment shown, application of the reset signal corresponds to receipt of the next burst or packet of the received optical signal.

Responsive to the reset signal, the control module 316 determines the value of the voltage at the signal pin 332 immediately prior to receipt of the reset signal. Since the rate select signal has transitioned to the second state, the control module 316 changes one or more characteristics of the TIA 314 leading to a period of settling of the TIA 314 (between t3 and t4). During this time, any voltage at the signal pin 332 may be ignored by the host device 304. After a predetermined period of time, e.g. the time period between output of the reset signal at t3 and t5, the signal at the signal pin 332 as generated by the control module 316 is once again proportional to the optical power of the received optical signal. At this stage, the host device 304 receives and processes the RSSI current at the signal pin 332 until receipt of a further RSSI trigger signal.

It can be seen that the voltage of the RSSI current applied by the control module 316 on the signal pin 332 is maintained lower than the voltage of the reset signal applied by the host device 304 on the signal pin 332. As such, the control module 316 can determine that the reset signal has been received by monitoring the voltage at the signal pin 332 whilst simultaneously outputting the RSSI signal on the signal pin 332.

Figure 5:
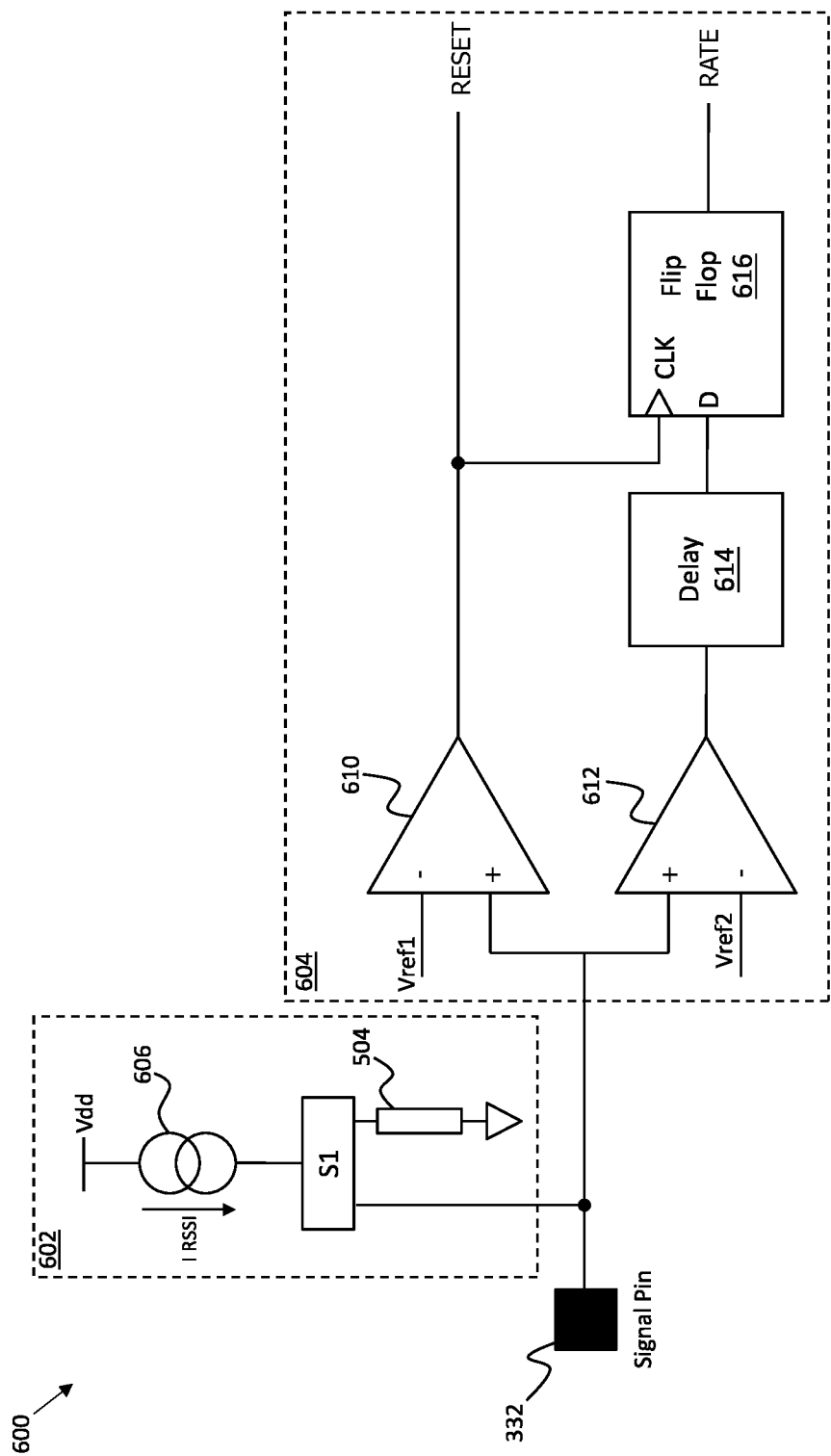
FIG. 5 is a schematic diagram of exemplary circuitry which may be implemented in a control module of the optical receiver according to aspects of the present disclosure.

FIG. 5 is a schematic diagram of exemplary circuitry 600 which may be implemented by the control module 316 for outputting an RSSI current to the signal pin 332 whilst monitoring for the rate select signal and the reset signal at the same signal pin 332. The circuitry 600 comprises RSSI current driver circuitry 602 and multi-level voltage monitoring circuitry 604.

The RSSI current driver circuitry 602 comprises a current source 606, configured to generate an RSSI current, a switch S1 and a resistor R1. The switch S1 is configured to selectively couple an output of the current source 606 (and therefore the RSSI current) to either the signal pin 332 or to ground via the resistor R1. The switch S1 may, for example, be implemented by a differential pair of switches (e.g. transistors).

The multi-level voltage monitoring circuitry 604 comprises a first comparator 610, a second comparator 612, a delay element 614, and a D-type flip-flop 616.

The comparators may be implemented using any known comparator technology, such as high-gain CMOS amplifiers or skewed invertors. Non-inverting inputs of each of the first and second comparators 610, 612 are coupled to the signal pin 332 of the optical receiver 302. An inverting input of the first comparator 610 is coupled to a first reference voltage Vref1, which may be set at two thirds of the supply voltage of the multi-level voltage monitoring circuitry 604 (2*Vdd/3). An inverting input of the second comparator 612 is coupled to a second reference voltage Vref2, which may be set to one third of the supply voltage Vdd of the multi-level voltage monitoring circuitry 604 (Vdd/3). Thus, the first reference voltage Vref1 is higher than the second reference voltage Vref2.

The first reference voltage Vref1 may be set at a reset threshold voltage, such that it is higher than a maximum voltage level of a received rate select signal, but lower than a maximum voltage level of a received reset signal. Thus, the first comparator 610 may output a 'high' signal value when the voltage at the signal pin 332 is greater than the first reference voltage Vref1. The second reference voltage Vref2 may be set at a rate select threshold voltage, such that it is lower than a maximum voltage level of the received rate select signal but higher than a minimum voltage level of the received rate select signal.

The output of the first comparator 610 is coupled to a clock input CLK of a flip-flop 616. The output of the second comparator 612 is coupled to the input of delay element 614 configured to apply a delay to the output signal from the second comparator 612. The output of the delay element 614 is provided to the data input D of the flip-flop 616. A 'high' output at the first comparator 610 is indicates receipt of the reset signal at the signal pin 332. A 'high' output at the flip-flop 616 indicates a high rate select signal.

Figure 6:
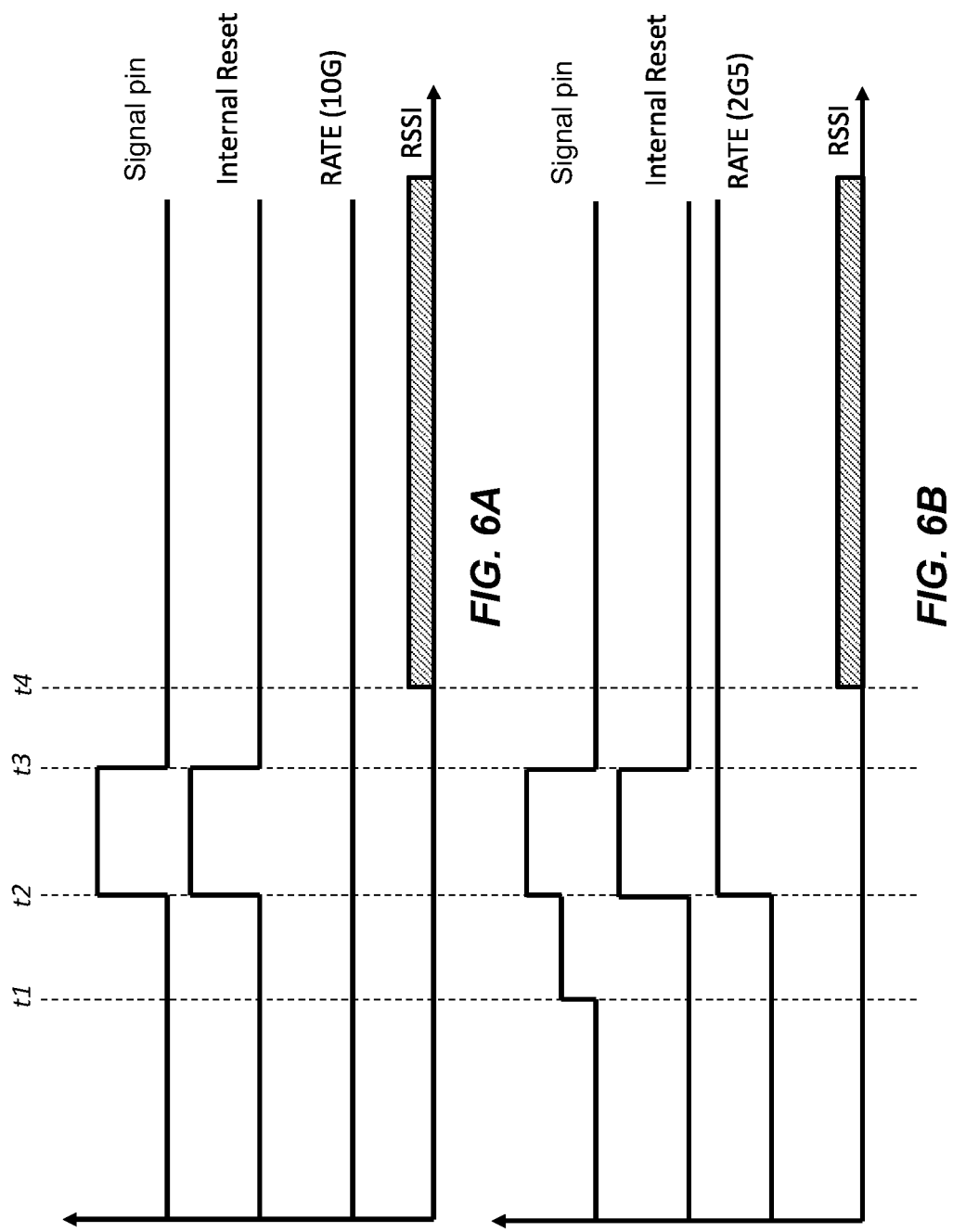
FIGS. 6A and 6B are timing diagrams of the signalling within the optical receiver according to embodiments of the present disclosure.

Operation of the circuitry 600 will now be described with reference also to FIGS. 6A and 6B. FIGS. 6A and 6B show timing diagrams for various signals involved the operation of the optical receiver 302. In descending order, these diagrams show the voltage at the signal pin 332, the internal reset of the optical receiver 302 (which may be the RESET line output from the first comparator 610), the bit rate to which the optical receiver 302 is set based on the received rate select signal (which may be the RATE line output from the flip-flop 616, low being e.g., 10 GB/s and high being e.g., 2.5 GB/s), and the RSSI signal output by the driver circuitry 602 to the signal pin 332. FIG. 6A shows a timing diagram for a scenario in which the rate select signal is toggled low. FIG. 6B shows a timing diagram for a scenario in which the rate select signal is toggled high.

The first and second comparators 610, 612 may first receive the rate select signal asserted at the signal pin 332 at their non-inverting inputs at time t1. The output of the first comparator 610 is toggled low and the output of the second comparator 612 is toggled either high or low depending on the state of the rate select signal. In FIG. 6A, since the rate select signal is toggled low, the voltage at the signal pin is also low as shown between t1 and t2. In FIG. 6B, since the rate select signal is toggled high, the voltage at the signal pin is also high. Note here that the high rate select signal has a lower voltage than that of the high reset signal.

After receiving the rate select signal, the first and second comparators 610, 612 may receive a reset signal at their non-inverting inputs, shown to arrive in FIGS. 6A and 6B at time t2. In this embodiment, the reset signal comprises a pulse having a rising and falling edge. The reset signal may signify the arrival of the next optical signal burst. As mentioned above, in this embodiment, the voltage of the reset signal is greater than that of the maximum rate select signal.

Since the reset signal is higher than Vref1, the first comparator 610 outputs toggles high. This signal is output both as the reset signal RESET and to the clock input CLK of the flip-flop 616 which toggles the flip-flop 616 to output the value of the signal at the data input D of the flip-flop 616. Due to the presence of the delay element 614, the signal at the data input D of the flip-flop 616 is a delayed version of the output from the comparator 612, which is the comparator output value associated with the rate select signal (received before the reset). Thus, the flip-flop 616 outputs the rate select signal RATE. In FIG. 6A, since the rate select signal was low, the RATE signal output from the flip-flop 616 stays low (at time t2). In FIG. 6B, since the rate select signal was high, the RATE signal output from the flip-flop 616 at t2 transitions high.

In response to receipt of the reset signal RESET, the control module 316 may control the switch S1 to couple the current source 502 to the signal pin 332, thereby driving the signal pin 332 with the RSSI current at time t4. The control module 316 may implement a fixed or variable delay between receipt of the reset signal RESET or the time at which the reset signal is de-asserted, i.e. after time t3. The delay may be associated with a settling time of the TIA 314 and/or other components of the optical receiver 302, particularly where the rate select signal indicates a change in bit rate of the received optical signal.

Figure 7:
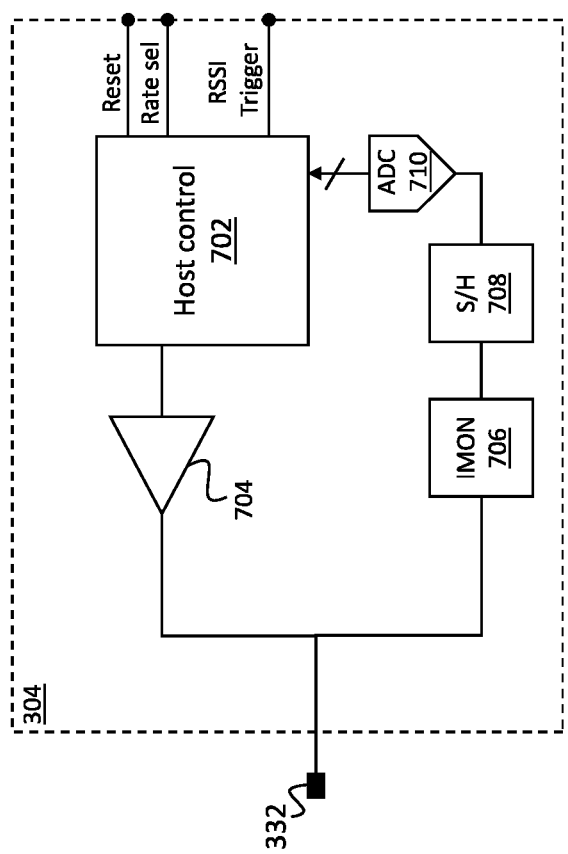
FIG. 7 illustrates an example implementation of a host device according to embodiments of the present disclosure.

FIG. 7 illustrates an example implementation of the host device 304. It will be appreciated that the host device 304 may comprise other modules and/or components (not shown).

The host device 304 may comprise a host control module 702, a multi-level voltage driver 704, a current monitor 706, sampling circuitry 708, and an analog-to-digital converter (ADC) 710.

Generally, the host control module 702 is configured to control output of rate and reset signals to the signal pin 332 and to process RSSI signals received at the signal pin 332.

On the driving side, the host control module is configured to receive an external RSSI trigger signal. In response to the RSSI trigger signal, the host control module 702 is configured to control the multi-level voltage driver 704 to drive the signal pin 332 at two or more voltages over time. Specifically, The voltage driver 704 may be configured to drive the signal pin 332 at a first voltage V1, a second voltage V2 and a third voltage V3 where V1<V2<V3. The first voltage V1 and the second voltage V2 pertain to the rate select signal. The third voltage V3 is the reset voltage. As such, the voltage driver 704 is configured to assert at the signal pin 332 both the reset signal and the rate select signal.

The current monitor 706, sampling circuitry 708 and ADC 710 are provided to process an RSSI current signal received at the signal pin 332 which is then provided to the host control module 702.

The current monitor 706, which in some embodiments may comprise current mirror circuitry, is configured to monitor the RSSI current signal and produce a monitor signal. The monitor signal is sampled by the sampling circuitry 708 which provides a sampled voltage corresponding to the monitor signal to the ADC 710. The ADC 710 converts this sampled voltage into a digital signal representative of the RSSI signal received at the signal pin 332. In some embodiments, the ADC 710 may be a successive-approximation ADC.

The host control module 702 is configured to receive the digital signal from the ADC 710. The host control module may then process and/or output the digital signal to one or more external modules (not shown).

Figure 8:
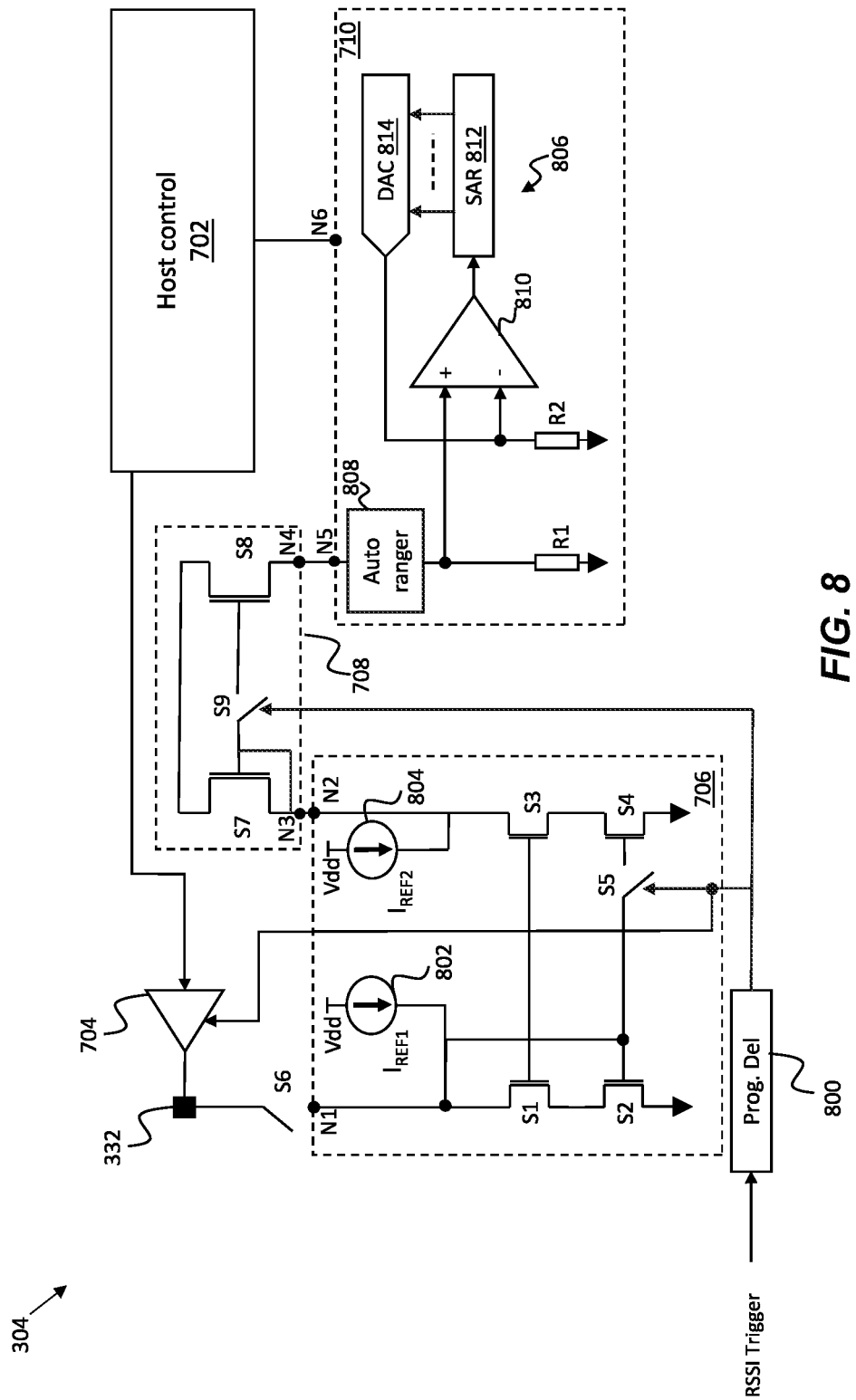
FIG. 8 illustrates a schematic diagram of an example embodiment of the host device of FIG. 7.

FIG. 8 illustrates an example implementation of the host device 304 shown in FIG. 7. Specifically, the current monitor 706, the sampling circuitry 708 and the ADC 710 are shown in more detail.

Additionally, it can be seen in FIG. 8 that each of the voltage driver 704, the current monitor 706 and the sampling circuitry 708 are controlled by a delayed version of the RSSI trigger signal which is delayed by a programmable delay module 800. Upon receipt of the delayed RSSI trigger signal the voltage driver 704 is configured to stop asserting rate select and/or reset signals at the signal pin 332. The current monitor 706 is controlled to output a mirrored version of the RSSI current at the signal pin 332 and the sampling circuitry 708 is controlled to sample the current provided by the current monitor 706. Such operation will be described in more detail below.

The current monitor 706 may comprise a low-side cascade current mirror as shown in FIG. 8. The current monitor 706 comprises first, second, third and fourth MOSFET switches S1, S2, S3, S4 (in this example transistor switches), which may be controlled by, for example, the host control module 702, the MCU 306, or another device (not shown). Each switch S1:S4 comprise a pair of terminals and a gate operable to control conductivity between the two terminals. The current monitor 706 further comprises first and second current sources 802, 804 configured to provide first and second reference currents IREF1, IREF2.

The first switch S1 and the second switch S2 are coupled in series between an input node N1 of the current monitor 706 and a ground reference voltage (e.g., GND). The third switch S3 and the fourth switch S4 are coupled in series between an output node N2 of the current monitor 706 and the ground reference voltage (e.g., GND). The gates of the first and third switches S1, S3 are coupled together. The gates of the second and fourth switches S2, S4 are switchably coupled together by a fifth switch S5 controlled by an RSSI trigger signal (as will be explained in more detail below). The gate of the second switch S2 is permanently coupled to the input node N1.

The first reference current source 802 is coupled between a supply voltage (Vdd) and the input node N1. The second reference current source 804 is coupled the output node N2. The first and second reference current sources 802, 804 are each configure to provide supplementary current in the form of first and second reference currents $I_{REF1}$, $I_{REF1}$ which may aid in speeding up the settling time of the current monitor 706. This may be particularly advantageous in cases when the RSSI current received at the signal pin 332 is relatively low when compared to an average current of the RSSI signal.

An input node N1 of the current monitor 706 is coupled to the signal pin 332, optionally via a sixth switch S6. The sixth switch S6 may be provided to disconnect the current monitor 706 from the signal pin 332 during a calibration of the host device 304, for example, to measure a DC voltage offset. This switch may be controlled, for example, by the host control module 702.

During operation, when the fifth switch S5 is closed, the current monitor 706 is configured to mirror a current received at the input node N1 (i.e. the current at the signal pin 332) to the output node N2.

The sampling circuitry 708 comprises seventh, eighth and ninth switches S7, S8, S9, each switch S7:S9 comprising a pair of terminals and a gate operable to control conductivity between the two terminals.

The seventh and eighth switches S7, S8 are coupled in series between an input node N3 of the sampling circuitry 708 and an output node N4 of the sampling circuitry 708. Gates of the seventh and eight switches S7, S8 are switchably coupled together via the ninth switch S9. Furthermore, the gate of the seventh switch S7 is coupled to the input node N3 of the sampling circuitry 708. The ninth switch S9 is controlled by the RSSI trigger signal.

The sampling circuitry 416 is configured to sample the mirrored RSSI current upon receipt of the RSSI trigger signal at the gate of switch S9 and provide a sample of the RSSI to the ADC 710 via the output node N4 of the sampling circuitry 708.

An external RSSI Trigger signal is received from an external source (not shown) and passes through a programmable delay module 800. The programmable delay module 800 is configured to implement a time delay in the RSSI Trigger signal.

The multi-level voltage driver 704 is coupled to the programmable delay module 800 and is configured to receive the delayed RSSI trigger signal. In response to the delayed RSSI trigger signal, and based on control signals received from the host control module 702, the multi-level voltage diver may generate a tri-level signal, comprising the reset and rate select signals, on the signal pin 332.

During operation, an RSSI current burst is received at the signal pin 332 from the optical receiver 302. This current is received at the input node N1 of the current monitor 706, which in this embodiment is realised by a wide-swing cascade current mirror.

In this embodiment, the ADC 710 comprises a successive approximation register (SAR) ADC 806. Optionally, the ADC 710 also comprises an auto ranger 808.

As is known in the art, the SAR ADC 806 comprises an ADC comparator 810, a SAR 812 and a digital-to-analog converter (DAC) 814. The ADC comparator 810 comprises a non-inverting input, an inverting input and an output. The output of the ADC comparator 810 is coupled to an input of the SAR 812. Digital outputs of the SAR 812 are provided as inputs to the DAC 814 which is configured to output an analog signal representing the digital inputs to the inverting input of the ADC comparator 810. Pulldown resistors R1, R2 are coupled between each of the inverting and non-inverting inputs of the ADC comparator 810 and a ground reference voltage such that when such inputs are not asserted, they are pulled to the ground reference voltage (GND).

The ADC comparator 810 is configured to toggle high when the non-inverting input is higher than the inverting input and toggle low when the inverting input is higher than the non-inverting input. As such, the digital output of the SAR 812 is adjusted such that the digital input signals provided to the DAC 814 represent the digital value of the signal provided to the non-inverting input of the ADC comparator 810. Such operation of SAR ADCs is known in the art and so will not be described in more detail here.

As noted above, the ADC 710 may comprise the auto ranger 808. The auto ranger 808 may be configured to scale the sampled RSSI signal into the voltage range of the ADC 710 such that it can undergo successful conversion into a digital representation. Thus, the auto ranger 808 outputs a scaled version of the RSSI signal to the non-inverting input of the ADC comparator 810.

The host control module 702 may be coupled to the DAC 814, SAR 812, and/or any other component or node of the ADC 710. The host control module 702 may be configured to receive the SAR register output (which represents the analog input signal) and may store, process and/or transmit the digital signal to downstream circuitry (not shown).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another.

Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages.

Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A packaged optical receiver, comprising:
a photodiode configured to receive an optical signal;
a transimpedance amplifier (TIA) coupled to the photodiode; and
a signal pin;
wherein the optical receiver is configured to receive, via the signal pin:
a reset signal; and
a rate select signal indicating a bit rate of the received optical signal, the rate select signal switchable between a first voltage indicative of a first bit rate of the received optical signal and a second voltage indicative of a second bit rate of the received optical signal different from the first bit rate; and
wherein the optical receiver is configured to output in response to the reset signal, via the signal pin, a received signal strength indication (RSSI) for the received optical signal.

2. The optical receiver of claim 1, wherein a sensitivity of the transimpedance amplifier is adjusted based on the rate select signal.

3. The optical receiver of claim 1, wherein, on a first transition of the reset signal, the optical receiver is configured to sample the rate select signal received before the first transition of the reset signal.

4. The optical receiver of claim 1, wherein the first voltage and the second voltage are lower than a reset voltage of the reset signal.

5. The optical receiver of claim 1, further comprising:
a first comparator having a first inverting input coupled to a first reference voltage; and
a second comparator having a second inverting input coupled to a second reference voltage;
wherein a first non-inverting input of the first comparator and a second non-inverting input of the second comparator are coupled to the signal pin.

6. The optical receiver of claim 5, further comprising a flip-flop having:
a clock input coupled to a first output of the first comparator;
a data input coupled to a second output of the second comparator; and a digital rate select output.

7. The optical receiver of claim 6, further comprising a delay element coupled between the data input and the second output of the comparator.

8. The optical receiver of claim 1, wherein the optical receiver is configured to output the RSSI at the signal pin after a first transition of the reset signal.

9. The optical receiver of claim 1, comprising:
current driver circuitry configured to output the RSSI at the signal pin in response to an enable signal.

10. The optical receiver of claim 9, wherein the current driver circuitry comprise:
a switch; and
a load resistor coupled between the switch and a ground reference voltage, wherein the switch is configured to switch the RSSI from the load resistor to the signal pin in response to the enable signal.

11. The optical receiver of claim 10, wherein the switch comprises a differential pair of switches.

12. A packaged optical receiver, comprising:
a photodiode configured to receive an optical signal;
a transimpedance amplifier (TIA) coupled to the photodiode;
current driver circuitry; and
a signal pin;
wherein the optical receiver is configured to receive, via the signal pin, a reset signal; and
wherein the current driver circuitry is configured to output in response to the reset signal, via the signal pin, a received signal strength indication (RSSI) for the received optical signal.

* * * * *